United States Patent

[11] 3,576,128

| [72] | Inventor | Harry E. Lockery |
| | | Sudbury, Mass. |
| [21] | Appl. No. | 806,824 |
| [22] | Filed | Mar. 13, 1969 |
| [45] | Patented | Apr. 27, 1971 |
| [73] | Assignee | BLH Electronics, Inc. |
| | | Waltham, Mass. |

[54] HALF BRIDGE MOMENT DESENSITIZATION OF PARALLELOGRAM-TYPE BEAMS
9 Claims, 6 Drawing Figs.

[52] U.S. Cl. .................................................. 73/141,
73/88.5, 177/211
[51] Int. Cl. ..................................................... G01l 1/22
[50] Field of Search ......................................... 73/141,
88.5; 177/211

[56] References Cited
UNITED STATES PATENTS

| 3,439,761 | 4/1969 | Laimins | 177/211 |
| 3,512,595 | 5/1970 | Laimins | 177/187 |
| 2,597,751 | 5/1952 | Ruge | 73/141X |
| 2,814,946 | 12/1957 | Harris, Jr. | 73/141 |
| 2,866,059 | 12/1958 | Laimins | 73/141X |
| 3,246,510 | 4/1966 | Ruge | 73/141 |
| 3,304,773 | 2/1967 | Rogallo | 73/141 |
| 3,398,581 | 8/1968 | DeLucia | 177/211X |

FOREIGN PATENTS

| 117,851 | 1958 | U.S.S.R. | 177/211 |

Primary Examiner—Charles A. Ruehl
Attorney—Thomson and Mrose

ABSTRACT: A rigid-ended multiple bending parallelogram-type beam which includes a plurality of electrical strain gauge elements mounted thereon is moment desensitized by the application of a pair of shunting resistors across a half of a bridge circuit arrangement formed by the strain gauge elements whereby accurate force measurements independent of load position may be realized.

PATENTED APR 27 1971 3,576,128

INVENTOR
HARRY E. LOCKERY by
Thomson, Mrose & Ericson
ATTORNEYS

INVENTOR
HARRY E. LOCKERY

HALF BRIDGE MOMENT DESENSITIZATION OF PARALLELOGRAM-TYPE BEAMS

BACKGROUND OF THE INVENTION

The present invention relates to improvements in the precision measurement of forces by way of gauged parallel-connected structural elements, and, in one particular aspect, to novel and improved electrical strain gauge apparatus of inexpensive compact construction wherein mechanically parallel structural members are gauged to function as accurate force sensors in a unique cooperative array which develops electrical output signals highly isolated from both unwanted information and from disturbances attributable to variations in the locations of loading forces.

It has long been well known to measure elastic strains resulting from loading-induced stresses of elements such as beams, columns, diaphragms and the like, using transducive electrical strain gauges for the accurate translations of the exhibited strains into convenient related variations in electrical impedances. Wire, foil, semiconductor and the like type of strain gauges find widespread application in such transducive devices and well lend themselves to manufacture in highly miniaturized forms suitable for installation upon small surface areas of such sensing elements.

Commonly, the above-described transducive type sensing elements have been designed and fabricated as self-contained devices intended to satisfy the needs of a variety of installations. In general, while somewhat satisfactory, the prior art type transducive sensing elements tended to be accurately responsive only when the loading was carefully centered with respect to a predetermined axis. When not so centered, undesirable side forces developed, which in the past have been alleviated in small-size units by the use of auxiliary diaphragms and in larger assemblies, such as those of massive weighing platforms or the like, by the use of strong but somewhat elastic structural members sometimes termed flexures or stay rods. Both arrangements thus effectively parallel the transducive sensing elements with flexible guide provisions. To the extent that the critical spring characteristics of the sensing device are modified by those of the parallel flexure members, a problem with measurement accuracy and linearity may be caused by any erratic or nonlinear behavior of these members. A solution to this problem has been to provide measurement transducers of a special parallelogram type which are themselves caused to provide the necessary mechanical support and stability in connection with the handling and evaluation of either massive or relatively small loads, such that the sole spring or flexure characteristics effective during measurements are those of the transducers, and accordingly, the need for auxiliary guides and supports are obviated. A typical such transducer may be formed of an elongated member having two transverse holes connected by a slot so as to provide upper and lower beams having flexible portions adjacent the top and bottom of the holes and relatively rigid longitudinal sections between the upper halves of each hole and between the lower halves of each hole, the holes being disposed inwardly of the end members to provide end portions one of which is secured inflexibly to a stationary support and the other to a relatively movable load-carrying structure. It was found that the above type transducer construction and mounting restricted the load carrying structure to a highly advantageous and substantially linear motion, and that measured strains exhibited at selected surfaces were found to characterize essentially pure shear when other effects are offset by bridge-circuit balancing. Accordingly, loads which dynamically undergo lateral movements, or are not centered, or which involve collateral forces could nevertheless be accurately measured by the associated strain gauge circuitry.

Recently it has become discovered that while the above-described transducer arrangements are generally satisfactory, that some error may still result from different load locations on the load carrying structures, such for example, a platform or the like. Such errors result primarily from two factors, the first being caused by differing sensitivities between the various sensing elements supporting the load carrying structure. Any error caused by such differing sensitivities can easily be taken care of by individually adjusting the relative sensitivities of the transducive sensing elements. The other error factor is caused by the moment sensitivity of the element itself. In particular, if the strain gauge sensing elements could be located perfectly, if their gauge factors were identical, and if the dimensions of the sensing sections were identical, then very good moment sensitivity would be achieved. However, in actual practice, this is extremely difficult, if not impossible, to attain, and it is therefore found that some change in output measurement will result if a vertical load is displaced relative to the longitudinal axis of the sensing sections because of moment sensitivity error.

SUMMARY

Accordingly, it is one of the objects of the present invention to provide a new and improved transducer apparatus for the efficient and accurate measurement of loads.

Another object of the subject invention is to provide high-precision electrical strain gauge transducers which respond essentially to forces in one direction.

Still another object of the present invention is to provide a new and improved strain gauge transducer of the low-cost multiple bending type parallelogram beam construction wherein is induced force responsive surface strains having a magnitude independent of position of the application of the load.

Further, another object of this invention is to provide new and improved strain gauge transducers which are insensitive to varying load locations.

Yet another object of the subject invention is the provision of parallel-beam strain gauge transducers with unique moment desensitization.

One other object of the invention is to provide improved weighing platforms which include unique moment desensitized parallelogram-type supports for the loading platform wherein insensitivity to measurement at varying load locations is provided.

By way of a summary account of practice of this invention in one of its aspects, a weighing platform is centrally mounted upon a pair of parallelogram type beam units. Electrical resistance strain gauges are applied to selected surfaces along the beam units and moment compensating shunting resistances are connected across a particular determined pair of the gauges such that a bridge reading is indicative solely of a vertical force being applied to the weighing platform irrespective of the positioning of the load.

BRIEF DESCRIPTION OF THE DRAWINGS

Although the features of this invention which are considered to be novel are expressed in the appended claims, further details as to preferred practices and as to further objects and features thereof may be most readily comprehended through reference to the following description taken in connection with the accompanying drawings, wherein:

DETAILED DESCRIPTION OF THE PREFERRED EMBODIMENTS

Figure 1:
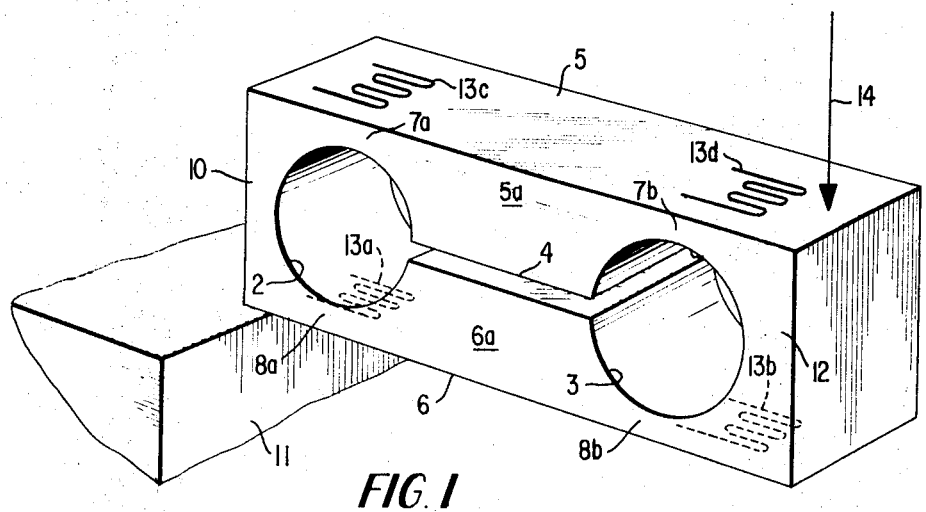
FIG. 1 illustrates a perspective view of a rigid-ended multiple bending parallelogram type beam.

Referring now to the drawings wherein like reference numerals designate identical, or corresponding parts throughout the several views, and more particularly to FIG. 1 thereof, wherein a conventional rigid-ended multiple bending parallelogram-type beam shown as formed by taking a solid elongated bar of any desired material and preferably of rectangular shape and then drilling two, preferably equal diameter holes 2 and 3 crosswise of the bar. A straight slot 4 is suitably machined as by milling to connect the two holes thereby providing an upper beam 5 and a lower beam 6. The slot 4 is such as to provide horizontally extending rigid portions 5a and 6a between the upper and lower halves of the two holes. The holes 2 and 3 are drilled with their axes lying in a common plane, which is substantially parallel and placed symmetrically between the top and bottom surfaces of the beam thereby producing top and bottom strain areas 7a, 7b and 8a, 8b of substantially equal thickness. The holes 2 and 3 are also disposed inwardly from the ends of the beam so that a relatively heavy end base 10 may be suitably anchored to a structural foundation 11, while the other end of the beams are rigidly connected together by a heavy section 12. The rigid ends 10 and 12 thus hold the two beams 5 and 6 in parallelism at all times during flexure thereof which will occur upon application of a load to the free end of the beam as indicated by the arrow 14.

Electrical impedance strain gauge means 13a, 13b, 13c and 13d, such for example as bonded wire, foil, semiconductor or the like type, are placed on the top and bottom high strain concentration surfaces of the beams 5 and 6, which allows for the measuring of extremely small forces with minimum deflection by the use of a conventional Wheatstone bridge or the like.

Figure 2:
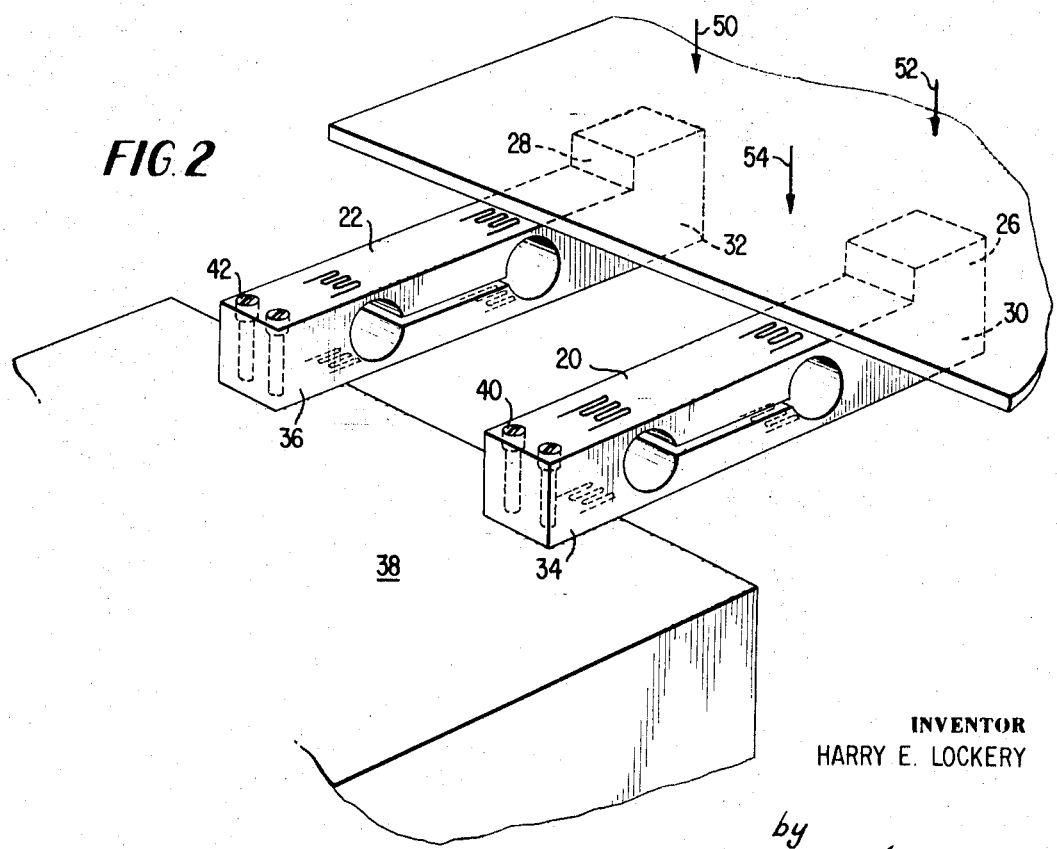
FIG. 2 is a perspective view of a weighing system employing the rigid-ended multiple bending parallelogram type beams of FIG. 1.

By way of illustration of a particular application of the multiple bending parallelogram-type beam transducer described with reference to FIG. 1 above, FIG. 2 shows a beam type weighing system which includes two such beams. It should be apparent, however, that the invention is not so limited and that what is hereinafter described by way of example is applicable to systems employing one or any number of such beam sensing elements.

Moreover, while the beam sensing element of FIG. 1 has been described with particular reference to the plural hole slotted type, it should be apparent that it is not so limited and any parallelogram-type beam sensing element may be used.

Referring again now to FIG. 2, there is shown a weighing platform 24 supported and secured by a pair of load carrying members 26 and 28 which are respectively connected to multiple bending parallelogram-type beams 20 and 22 at the respective free ends 30 and 32 thereof. It should be understood that while load carrying members 26 and 28 are shown as separate members that if so desired, a single crossbeam member connected between the free ends 30 and 32 could equally be used. It should also be understood that the load carrying members 26 and 28 have been conveniently centered near the ends of the weighing platform 24 to provide added support thereto.

The other ends 34 and 36 of multiple bending beams 20 and 22 are respectively fixedly attached to a stationary foundation 38 by the use of conventional bolts 40 and 42 or the like.

As previously indicated if the gauges on the surface of the beam sensing elements 20 and 22 could be perfectly located on the top and bottom thereof, if their gauge factors were identical, and if the dimensions of the transducive sensing sections and in particular the strain areas could be made equal, then the sensing elements would be sensitive primarily to the application of a vertical force only and would be insensitive to the distance between the application of that force and the particular sensing sections by virtue of the fact that the strain gauges are arranged in such a way that the difference in bending moments at the strain gauge locations at the opposite ends of the beams would be the same irrespective of loading position. However, also as previously indicated, in actual practice, the above situation is difficult, if not impossible, to attain and accordingly errors may result if a load is moved parallel to the longitudinal axis of the sensing elements.

For example, any load placed at different longitudinal directions along the weighing platform 24, such as the positions shown by arrows 50, 52 and 54, will result in error dependent upon the moment sensitivity of the respective multiple bending beams 20 and 22.

The manner of uniquely reducing to a minimum any error factor resulting from the existing moment sensitivity of the transducive beam sensing elements is explained with reference to FIGS. 3 through 6 below.

Figure 3:
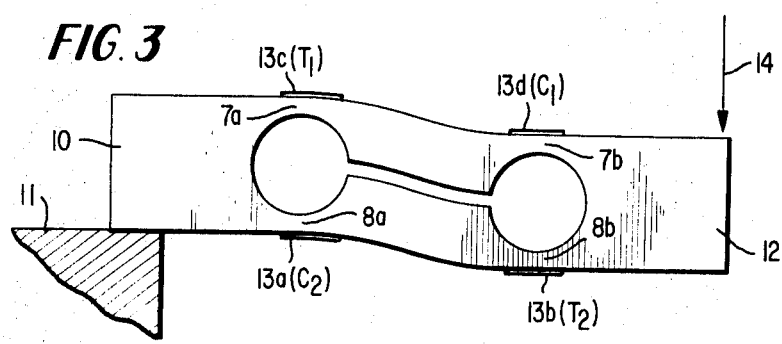
FIG. 3 is a side view showing the rigid-ended multiple bending parallelogram-type beam of FIG. 1 in its shearing mode.
Figure 4:
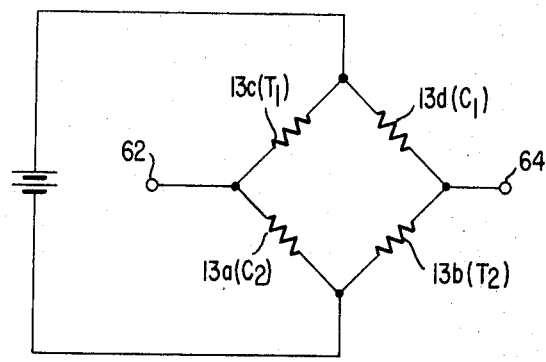
FIG. 4 shows a bridge-circuit arrangement for the strain gauges in FIG. 3.

Referring now to FIG. 3, there is shown a multiple bending type parallelogram beam of similar configuration to that of FIG. 1 in its shear sensing mode. The highly concentrated strained areas 7a, 7b, 8a and 8b are seen to deform, in the manner shown, in response to the application of a vertical loading 14 at free end 12 thereof. From the FIG., it is seen that the rigid end portion 12 remains substantially level while it descends in a vertical direction. Under the load-induced bending deflection conditions described above, the multiple bending type parallelogram beam will exhibit unique surface strains. In particular, gauges 13b and 13c will experience tension (T), while gauges 13a and 13d will experience compression (C). The gauges may then be wired in a conventional Wheatstone bridge arrangement, as shown in FIG. 4, so that an output developed at terminals 62 and 64 thereof will be directly proportional to the vertical force load 14 applied as shown in FIG. 3. A current meter, recorder or the like may be connected across terminals 62 and 64 for a direct indication of the magnitude of the vertical load 14.

Figure 5:
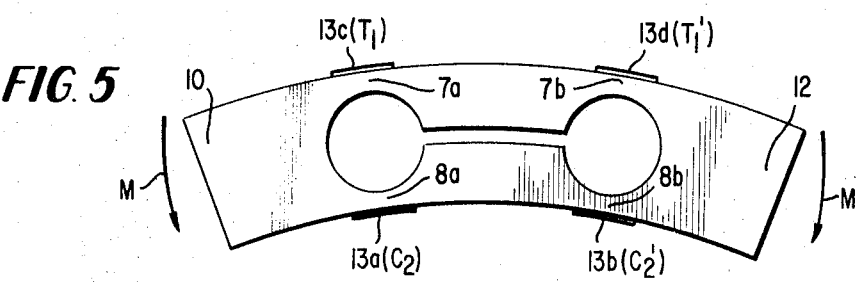
FIG. 5 shows a side view of a multiple bending parallelogram type beam in a pure bending mode.

Referring now to FIG. 5, it should be apparent that if pure bending alone is applied to the multiple bending type parallelogram beam transducer that the directions of strain on the individual strain gauges, gauges 13a and 13b being in compression and gauges 13c and 13d being in tension, would be such that in a bridge arrangement similar to that of FIG. 4, cancellation of the bending moment, designated as M in FIG. 5, would be achieved only if one could assume exact gauge placement, equal gauge factors and identical dimensions throughout the beam sensing section. Once again it is worth emphasizing that this is difficult, if not impossible, to attain so that some unique moment compensation means was found necessary.

It has been discovered that when a load is moved along a longitudinal axis of a parallelogram beam transducer that one-half of a bridge measuring arrangement, such as the bridge circuit shown in FIG. 4, will provide a greater output voltage change across terminals 62 and 64 due to a given moment change than the other half. The half bridge which will exhibit the greater output voltage per given moment change is that half which lacks the best symmetry because of the difficulty of obtaining exact strain gauge location, strange gauge factors and dimensions of the beam sensing sections.

The effect on the bridge circuit output for a change in load location will be either an additive or a subtractive voltage effect depending upon which direction the above-mentioned desired symmetry is off.

Figure 6:
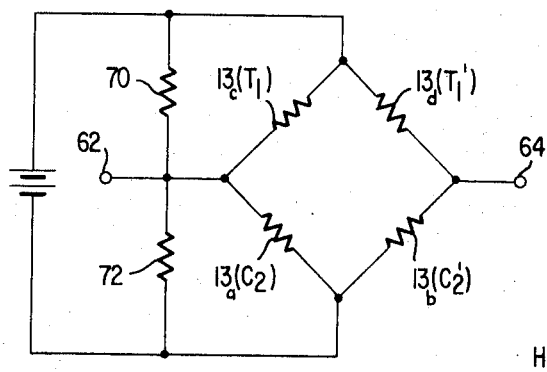
FIG. 6 shows a bridge-circuit arrangement which includes the moment desensitization of a multiple bending parallelogram type beam according to the present invention.

After the most moment sensitive bridge half is located, as described above, a pair of essentially equal resistors 70 and 72, as shown in FIG. 6, are shunted across the respective gauges to effectively load the output thereof and eliminate the either additive or subtractive effect therefrom. The value of the shunt resistors is large in proportion to that of gauge resistance and is determined by continuously displacing a load along a longitudinal axis of the beam transducer and simultaneously changing the shunt resistor values, such for example as by the use of a conventional decade resistance box, while measuring the output voltage across terminals 62 and 64 of the bridge circuit until a minimum output voltage change exists, for a given change in moment. Now, referring once again to FIG. 5, it will be apparent that since the output at terminals 62 and 64 of the bridge arrangement of FIG. 6 in pure bending is dependent upon the difference in strain at the two strain gauge locations 7a, 8a and 7b, 8b, then the change in bridge output should now be zero, since the two half bridges by use of shunt resistors 70 and 72 have been desensitized and thus caused to have the same sensitivity in bending. Thus, since both bridge halves change at the same rate, the difference in outputs resulting from a change in moments will be zero and the bridge will give an accurate force measurement independent of the positioning of a load. It should be understood that in FIG. 6 the two strain gauges 13a and 13c nearest the fixed end 10 of the beam were shunted by way of example only and that this is not necessarily the case. In particular, depending upon design symmetry, it is equally possible that strain gauges 13b and 13d nearest the location of the load would have needed desensitization by the application of a pair of shunt resistors thereacross.

Accordingly, it should be understood that the specific embodiments and practices herein described have been presented by way of disclosure rather than limitation, and that various modifications, combinations and substitutions may be effected by those skilled in the art without departure in spirit or scope from this invention in its broader aspects and as set forth in the appended claims.

I claim:

1. Force measuring apparatus comprising a relatively fixed support, force-responsive means, and at least one structural transducer means providing substantially the sole mechanical mounting for said force-responsive means in relation to said support, said structural transducer means comprising a pair of spaced substantially parallel beam elements of material having high elasticity, means rigidly interconnecting the adjacent ends of said beam elements together and to said force-responsive means, means rigidly interconnecting the opposite ends of said beam elements together and to said support, a plurality of electrical strain gauge means mounted substantially on the most strain sensitive portions of said parallel beam elements, said strain gauge means being essentially responsive only to stresses characterizing the magnitudes of forces applied to said structural transducer means by said force-responsive means in a direction perpendicular to said beam elements in substantially the same plane therewith, said structural transducer means limiting deflections of said force-responsive means relative to said support to substantially said direction, said plurality of electrical strain gauge means including at least two electrical resistance strain gauges connected to surfaces of each of said beam elements at the different end strain sensitive portions thereof, and shunt resistance means including at least two resistors connected in parallel across two of said strain gauges located on opposite beam elements at the same end of said structural transducer means and having resistance which counters errors in force measurement caused by moment sensitivity of said transducer means.

2. Force measuring apparatus as in claim 1 wherein said strain gauges are connected in a bridge circuit arrangement with half of the bridge circuit arrangement including said shunt resistors connected thereacross.

3. Force measuring apparatus as in claim 2 wherein the half of said bridge circuit arrangement which includes said shunt resistors is that half which would cause the greatest change in electrical output from said bridge arrangement for a given moment change in the absence of said resistors.

4. Force measuring apparatus as in claim 3 wherein the value of said shunt resistors is of a much greater value than that of the resistance of the strain gauges across which they are connected, the value of said shunt resistors being that which causes a minimum output change to result in the electrical output of said bridge circuit arrangement for a given change in location of a force applied to said beam elements and in moment resulting therefrom.

5. Force measuring apparatus as in claim 4 wherein said bridge circuit arrangement is of the Wheatstone type.

6. Force measuring apparatus comprising a substantially rigid weighing platform, relatively fixed support means and a plurality of beam transducive sensing elements providing the sole mechanical mounting for said platform in relation to said support means, each of said beam transducive sensing elements being alike and comprising a pair of like substantially horizontal parallel beam elements of material having a high modulus of elasticity and having their adjacent ends united one above the other by substantially rigid interconnecting portions, means securing one of the interconnected ends of each of said sensing elements to said support means, means securing the other of the interconnected ends of each of said sensing elements to said platform with said platform disposed substantially horizontally above said beam transducive sensing elements, and four electrical resistance strain gauges associated with each of said beam transducive sensing elements, each of said gauges being secured to a strain sensitive surface of said beam elements near a different one of said ends thereof, two of said gauges on the same end of each of said sensing elements having resistance means connected thereacross, means connecting said strain gauges and resistance means in a bridge arrangement wherein said resistance means causes electrical outputs from said bridge arrangement to characterize accurately the forces applied to said platform regardless of the positioning of load on said platform.

7. Force measuring apparatus as in claim 6 wherein said resistance means are shunt resistors which desensitize said bridge arrangement with respect to error caused by change in moment attending change in load location, and wherein said connecting means connects said strain gauges in a bridge arrangement wherein said gauges tend to characterize only the vertical loading on said platform.

8. Force measuring apparatus as in claim 7 wherein the half of said bridge circuit arrangement which includes said shunt resistors is that half which would cause the greatest change in electrical output from said bridge arrangement for a given moment change in the absence of said resistors.

9. Force measuring apparatus as in claim 8 wherein said bridge circuit arrangement is of the Wheatstone type.